United States Patent
Lightman et al.

(10) Patent No.: US 11,474,296 B2
(45) Date of Patent: Oct. 18, 2022

(54) FIBER ORBITAL ANGULAR MOMENTUM MODE SORTER

(71) Applicants: Soreq Nuclear Research Center, Yavne (IL); Ramot at Tel Aviv University, Tel Aviv (IL)

(72) Inventors: Shiomi Lightman, Raanana (IL); Gilad Hurvitz, Ramat Hasharon (IL); Razi Gvishi, Tel Aviv (IL); Ady Arie, Herzliya (IL)

(73) Assignee: Soreq Nuclear Research Center, Nahal Soreq (IL)

( * ) Notice: Subject to any disclaimer, the term of this patent is extended or adjusted under 35 U.S.C. 154(b) by 0 days.

(21) Appl. No.: 17/268,489

(22) PCT Filed: Aug. 7, 2019

(86) PCT No.: PCT/IB2019/056728
§ 371 (c)(1),
(2) Date: Feb. 15, 2021

(87) PCT Pub. No.: WO2020/035765
PCT Pub. Date: Feb. 20, 2020

(65) Prior Publication Data
US 2021/0165164 A1 Jun. 3, 2021

Related U.S. Application Data

(60) Provisional application No. 62/718,476, filed on Aug. 14, 2018.

(51) Int. Cl.
*G02B 6/26* (2006.01)
*G02B 6/24* (2006.01)
*G02B 6/25* (2006.01)

(52) U.S. Cl.
CPC .......... *G02B 6/262* (2013.01); *G02B 6/241* (2013.01); *G02B 6/25* (2013.01)

(58) Field of Classification Search
CPC .......... G02B 6/262; G02B 6/241; G02B 6/25
USPC ............................................. 385/15
See application file for complete search history.

(56) References Cited

U.S. PATENT DOCUMENTS

2018/0063519 A1* 3/2018 Smithwick ............ G02B 30/24
2018/0069631 A1* 3/2018 Ashrafi ................ G02B 6/2726

OTHER PUBLICATIONS

PCT Search Report and Written Opinion PCT/IB2019/056728, dated Nov. 21, 2020.
Zhenwei et al., "Integrated (de)multiplexer for orbital angular momentum fiber communication", Photonics Research, vol. 6, No. 7, pp. 743-749, Jun. 29, 2018.
Eznaveh et al., "Annular Core Photonic Lantern OAM Mode Multiplexer", 2017 Optical Fiber Communication Conference, pp. 1-3, Mar. 19, 2017.
Bozinovic et al., "Terabit-scale orbital angular momentum mode division multiplexing in fibers", Science, Jun. 28, 2013; 340(6140):1545-8.

(Continued)

*Primary Examiner* — Jerry M Blevins
(74) *Attorney, Agent, or Firm* — Dekel Patent Ltd.; David Klein

(57) ABSTRACT

A fiber mode sorter includes an optical fiber including a waveguide structure configured to maintain an orbital angular momentum (OAM) of a beam propagating through the optical fiber, and an OAM mode sorter placed on a core of the optical fiber.

7 Claims, 4 Drawing Sheets

(56) References Cited

OTHER PUBLICATIONS

Hao Huang et al., "Mode division multiplexing using an orbital angular momentum mode sorter and MIMO-DSP over a graded-index few-mode optical fibre", Scientific Reports, vol. 5, No. 1, pp. 1-6, Oct. 9, 2015.
Lightman et al., "Miniature wide-spectrum mode sorter for vortex beams produced by 3D laser printing", Optica, vol. 4, No. 6, pp. 605-610, Jun. 2, 2017.
Ksenia et al., "Single mode fiber based delivery of OAM light by 3D direct laser writing", Optics Express, vol. 25, No. 17, pp. 19672-19679, Aug. 7, 2017.

* cited by examiner

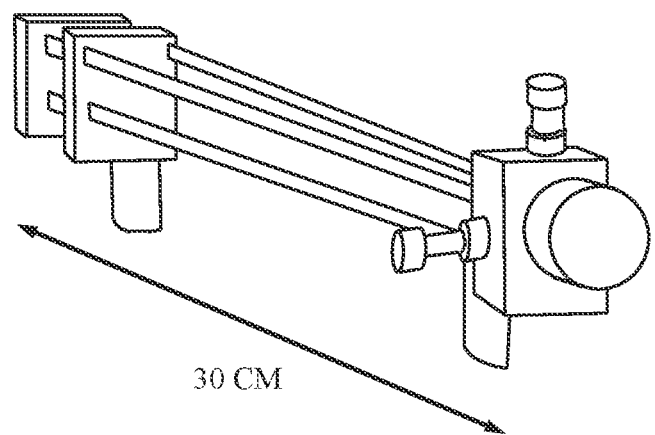
FIG. 1 - PRIOR ART
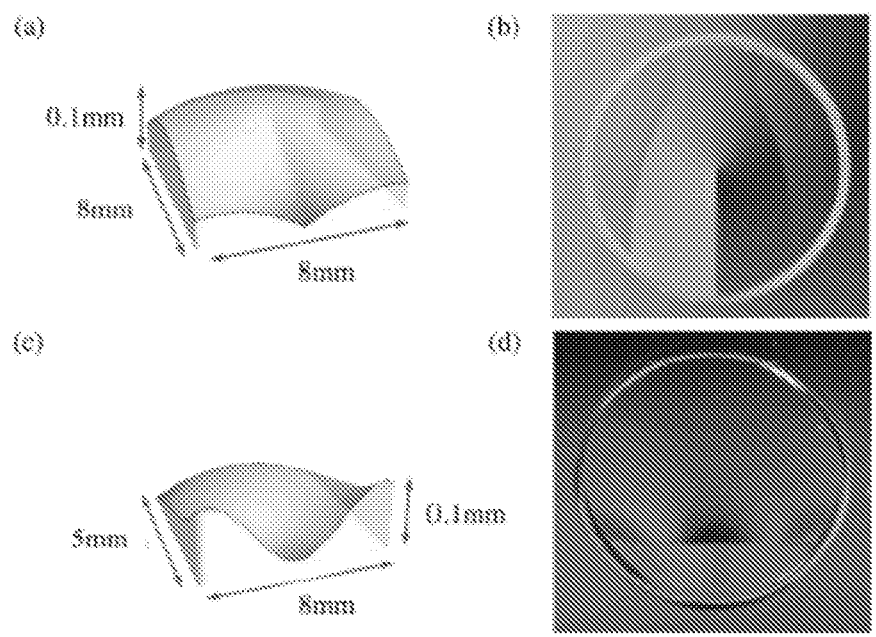
Figs. 2A, 2B, 2C, 2D – PRIOR ART

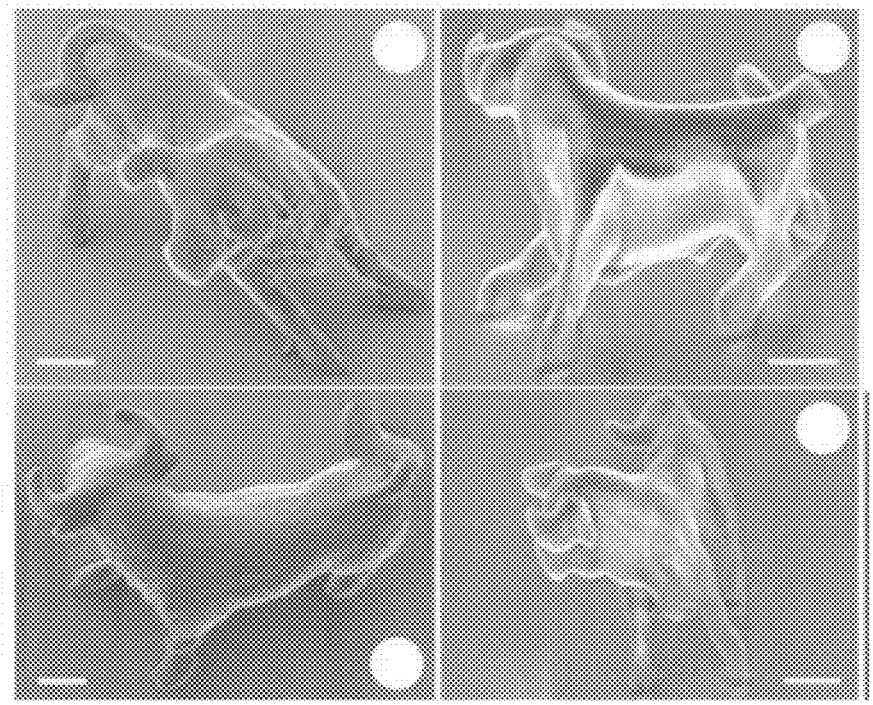
FIG. 3 – PRIOR ART
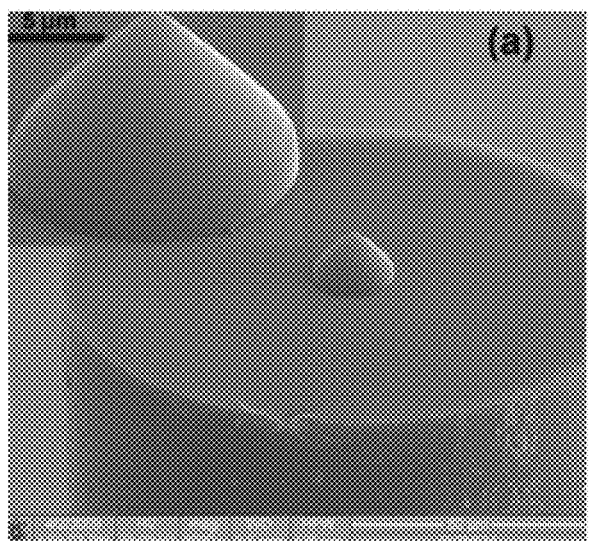 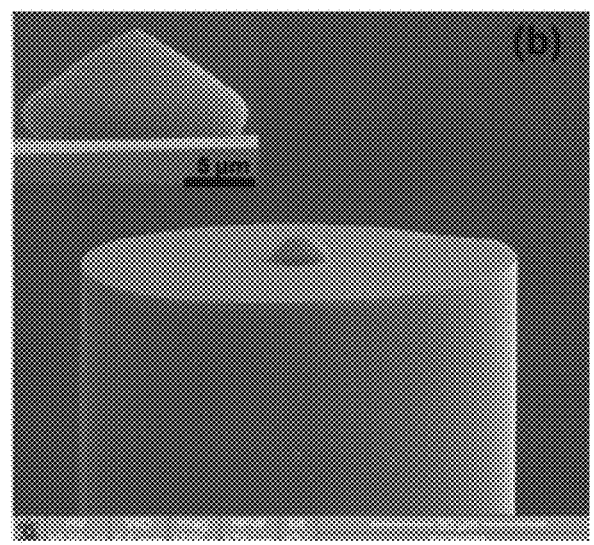
FIG. 4A – PRIOR ART        FIG. 4B – PRIOR ART

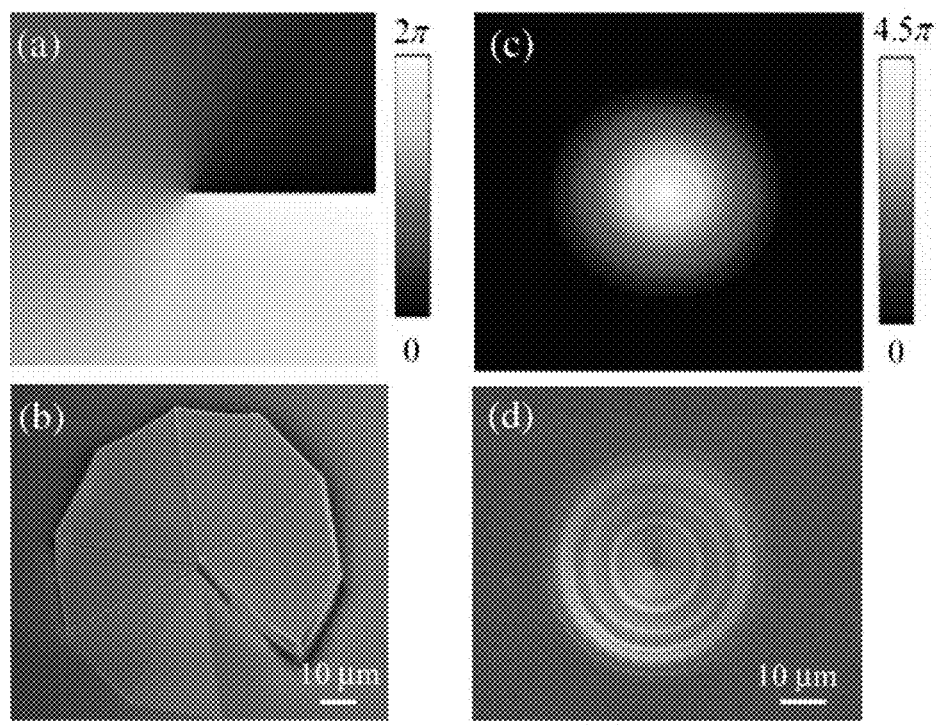
FIGS. 5A, 5B, 5C, 5D – PRIOR ART
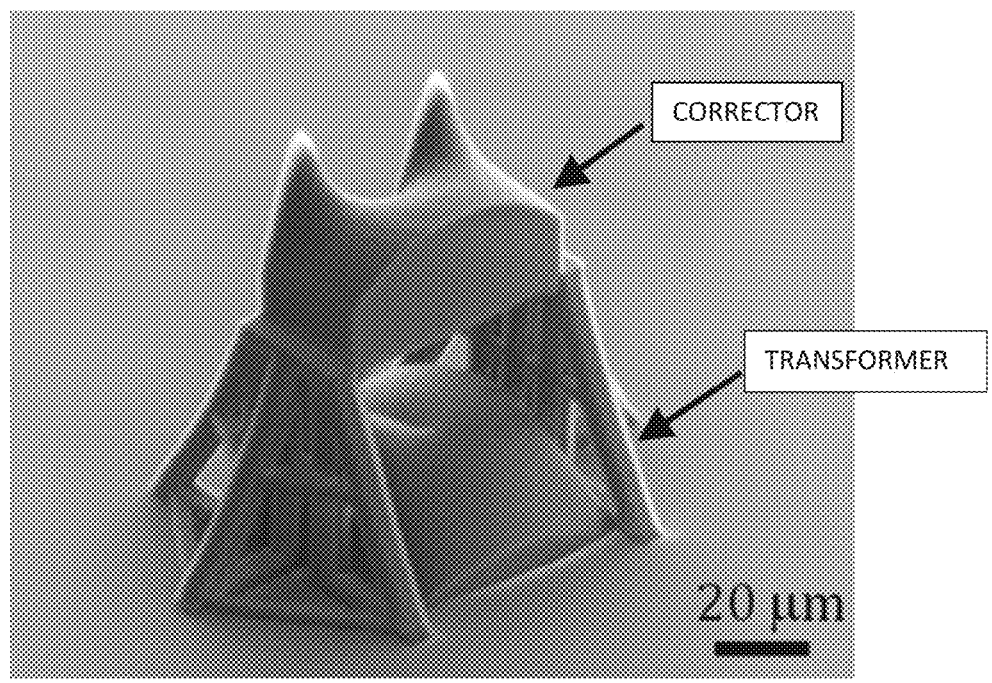
FIG. 6 – PRIOR ART

FIBER ORBITAL ANGULAR MOMENTUM MODE SORTER

FIELD OF THE INVENTION

The present invention generally relates to mode sorting of light beams with orbital angular momentum (OAM) travelling in optical fiber, which can be used, for example, in communication applications.

BACKGROUND OF THE INVENTION

Orbital Angular Momentum (OAM)

In the modern world there is an increasing need for transferring information by optical fibers with high capacity. A property of light called orbital angular momentum (OAM) has been recognized to have potential utility in enabling the multiplexing of multiple data-carrying beams [1]. In general, a light beam carrying OAM can be identified by its helical phase front, implying that its associated Poynting vector "twists" along the propagation direction. This twist results in a phase change across the wavefront and a doughnut-like intensity profile. Depending on the rate of phase front twisting, the OAM carried by a light beam can be quantified as $\ell\hbar$ per photon, where $\hbar$ is the reduced Plank constant and $\ell$ is an unbounded integer. Each OAM beam with a particular value of $\ell$ is orthogonal to all others. Thus, multiple data-carrying OAM beams with different $\ell$ could be efficiently multiplexed at a transmitter, coaxially propagated, and subsequently demultiplexed at a receiver. Thus, the OAM property of light enables mode multiplexing based on the OAM values. OAM can be used to increase the capacity and spectral efficiency (i.e., bits/sec/Hz) of an optical communication link.

An OAM mode sorter functions as a mode multiplexer from a single-mode fiber (SMF) array to a few-modes fiber (FMF) and also functions as a mode demultiplexer from FMF to SMF. As a demultiplexer, the OAM mode sorter transforms N multiplexed OAM modes, each with a different $\ell$, into N laterally separated and elongated spots. When using the OAM mode sorter as a multiplexer, N laterally separated and elongated spots can generate N OAM modes that are spatially multiplexed.

Light beams carrying OAM were introduced 25 years ago by Allen, Beijersbergen, Spreeuw, and Woerdman [2]. Their seminal paper established that light beams with helical phase-fronts carry OAM. More recently Willner, Padgett, Tor and associates [3-5] demonstrated high-capacity optical communications with orbital momentum beams. In addition, Willner, Tor, Ramachandran and associates demonstrated the viability of using OAM light beams for multiplexing in fibers over more than 1 kilometer length of vortex fiber and with terabit scale per second capacity with 10 wavelengths [6].

An early explicit use of OAM for free-space communication was in 2004 by Padgett and associates [7], where the transmitter and receiver units are based on spatial light modulators, which prepare or measure a laser beam in one of eight pure OAM states. In 2010 Berkhout, Padgett, and associates [8] presented an innovative concept for efficient sorting of OAM states by applying a Cartesian to log-polar transformation. Two static optical elements were used for converting the helically phased light beam corresponding to OAM states into a beam with a transverse phase gradient. A subsequent lens then focuses each input OAM state to a different lateral position, where the tilt angle depends on the topological charge, $\ell$. A more advanced device for measurement of the OAM of a single photon was demonstrated in 2012 by Padgett, and associates [9]. They used a mode transformer for OAM beams in a telescope-to-telescope geometry, with dimension of ~30 cm length and composed of 2 optical elements (cm scale each) in free-space configuration on optical bench, shown in FIG. 1. The phase profile of the elements is shown in FIGS. 2A, 2B, 2C and 2D [9], wherein the elements were fabricated by a diamond machining using ultra precision machine. The surfaces elements were made of polymethylmethacrylate (PMMA) with aperture size of 8 mm.

Willner, Padgett, Tor and associates demonstrated extensive work of tunable OAM mode filtering based on optical geometric transformation [10]. The input OAM beams were created by a programmable spatial light modulator (SLM). They experimentally demonstrated tunable filtering of one or multiple OAM modes from four multiplexed input OAM modes with vortex charge of −9, −4, 4, and 9. The measured output power suppression ratio of the propagated modes to the blocked modes exceeds 14.5 dB.

Direct Laser Writing (DLW)

However, for practical use of such optical elements in applied systems, a better solution in terms of size, cost, and stability should be used. Advanced fabrication capabilities can be attained by printing three-dimensional (3D) elements directly on optical elements using a direct laser writing (DLW); this method was presented in a review by Farsari and associates [11]. Pioneering work on single-photon DLW was performed in the early '90s [12,13]. DLW by multi-photon polymerization was first demonstrated in 1997 by Kawata and associates [14], were a sub-micron DLW of 3D structures presented by them in nature 2001 [15], presented in FIG. 3. Immediately this technology was embraced by the photonics community, for its capability in the fabrication of fully 3D, micro and sub-microstructures. The concept of the DLW is based on the nonlinear photon absorption by photopolymers; the beam of an ultra-fast laser is tightly focused inside the volume of a transparent material, causing it to absorb two or more photons and polymerize locally. Moving the beam according to a path representing a Computer Aided Design/Computer Aided Manufacturing (CAD/CAM) model, one can fabricate a realistic micro-model of this design [11].

In the earlier years the photonics community used self-made systems for DLW fabrications based on femtosecond laser [16-18]. In 2007, Nanoscribe, a spin-off from the Karlsruhe Institute of Technology (KIT), by Wegener, von Freymann, Thiel and Hermatschweiler [19], developed a commercial DLW system. The Nanoscribe commercial DLW is used extensively by the photonics community for DLW fabrication of 3D micro-scale structures [20].

Recently in 2010, Wegener and associate demonstrated diffraction-unlimited DLW with feature sizes of 10 nm in all three dimensions [21]. The concept is based on a combination of DLW and stimulated emission depletion (STED) fluorescence microscopy introduced by Stefan W. Hell, and it has revolutionized the field of optical microscopy [22]. Currently there is no commercial system of STED-DLW.

In addition, in 2010 Di Fabrizio and associate reported the fabrication of micro-optics with different shapes on top of optical fibers using a single two-photon lithography (TPL) DLW technique [23], examples of which are shown in FIGS. 4A and 4B. Recently, Wiess and Marom claim on demonstrating direct 3D nanoprinting on fiber tip of collimating lens and OAM mode converter in one compound element [24]. Until recently fabrication of 3D-structures by DLW was limited for using photo-resist based on organic polymer or sol-gel materials. In 2014 Greer and associate presented a route for fabrication of 3D-structures from metals and ceramics by using the polymeric 3D-structures by DLW as molds [25,26]. Creation of ceramic nano-lattices begins with the design and writing of a three-dimensional (3D) polymer scaffold using two-photon lithography direct laser writing. A thin alumina film is then deposited onto the polymer scaffold by atomic layer deposition (ALD), so that it coats the entire surface. The outermost walls of the coated structure are then removed by focused ion beam milling (FIB), and the internal polymer is etched away in $O_2$ plasma.

OAM Mode Sorter by DLW

In 2015 Lightman et al. presented that microstructures can be printed directly on optical devices, such as crystal facets, lenses and glass can be done using a three-dimensional (3D) direct laser writing system [27]. Examples of 3D structures include phase elements, helix steps and axicon shapes for creation of Vortex and Bessel beams, as seen in FIGS. 5A-5D.

More recently Lightman et. al demonstrated fabrication of micron-scale mode sorting device [28]. Two cases were demonstrated, in which two separate free-space elements and a dual-element were fabricated using a DLW, shown in FIG. 6. With the two separate free-space mode sorting elements it was possible to differentiate single and mixed OAM states in the range $-3 \leq l \leq 3$ (l is an integer) at wavelength between 690 to 990 nm. In the case of the dual-element OAM sorting the two transforming and correcting elements were fixed using supporting pillars. This integrated sorter was fabricated in a single, continuous printing process using the IP-DIP photoresist. It is important to emphasize that a fabrication of an integrated mode sorter cannot be done by other methods that were used so far, such as diamond turning [9] or CNC milling [4]. The distance between each printed layer of the elements was chosen to be 200 nm. The lateral dimensions of the transformer and corrector were 60×60 μm and 60×30 μm, with maximum heights of 32 and 51.5 μm, respectively. The axial distance between the element bases was calculated to be 60 μm. This device saves the need for careful alignment and positioning of the two separate elements. Furthermore, the distance between the two elements is more than an order of magnitude shorter with respect to the mode sorter that was described previously. The Fresnel number of this integrated system, which is inversely proportional to this distance, is quite large (~21). This means that this smaller and more precise system can potentially accommodate vortex beams up to a charge of 10. A 1550 nm wavelength was used to overcome the moderate optical quality of the fabricated surfaces. This approach enabled successive measurements of 0, $1\hbar$, $2\hbar$OAM values, and a mixed state of $\pm 1\hbar$ ($\hbar$ is the reduced Planck constant).

The main achievements of the development shown in FIG. 6 are:

1. Minimize the size of the device scale by 3 magnitude of size.
2. Attaching the two pair of sorting elements together and therefore saves the need for careful alignment and positioning of the two separate elements.
3. Fabrication of the integrated mode sorter in a single, continuous printing process, which cannot be done by other methods that were used so far, such as diamond turning or CNC milling.

SUMMARY OF THE INVENTION

There is thus provided in accordance with a non-limiting embodiment of the present invention a fiber mode sorter including an optical fiber including a waveguide structure configured to maintain an orbital angular momentum (OAM) of a beam propagating through the optical fiber, and an OAM mode sorter placed on a core of the optical fiber.

The fiber may be a vortex fiber and the OAM mode sorter could be placed on a facet of the vortex fiber by printing the OAM mode sorter on the core by using direct laser writing.

BRIEF DESCRIPTION OF THE DRAWINGS

The present invention will be understood and appreciated more fully from the following detailed description taken in conjunction with the drawings in which:

FIG. 1 is an illustration of a prior art mode transformer for OAM beams in a telescope-to-telescope geometry, in free-space configuration [8].

FIGS. 2A, 2B, 2C and 2D are illustrations of prior art phase profile elements for mode sorting, prepared by diamond machining.

FIG. 3 is an illustration of prior art micro-fabrication and nano-fabrication at sub diffraction-limit resolution, wherein the bull sculpture was produced by raster scanning.

FIG. 4A is an illustration of a prior art SEM image of a fabricated conical lens with 80 apex angle (enlarged view in the inset).

FIG. 4B is an illustration of a prior art SEM image of a fabricated conical lens with 120 apex angle (lateral view in the inset) [23].

FIGS. 5A-5D are illustrations of a prior art 2D phase distributions for both vortex (FIG. 5A) and Bessel beam generation (FIG. 5C), and corresponding pictures of the laser written phase elements, taken by SEM (FIG. 5B) and (dark field) optical microscope (FIG. 5D) [27].

FIG. 6 is a SEM (scanning electron microscope) picture of a prior art dual-element (combined) mode sorter. The transformer and corrector elements are integrated on a glass substrate. The relatively massive poles are needed for accurate alignment [28].

DESCRIPTION OF EMBODIMENTS

Figure 7A:
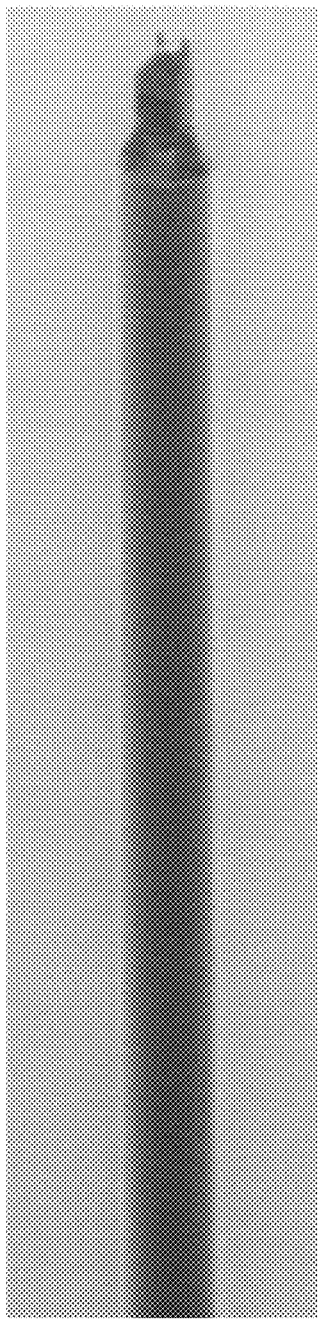
FIGS. 7A and 7B are illustrations of a fiber mode sorter, in accordance with an embodiment of the present invention, including a vortex fiber facet and a dual-element miniature mode sorter placed on the core of an optical fiber. This fiber mode sorter includes three printed optical devices on the tip of a vortex fiber allowing the separation of vortex modes.
Figure 7B:
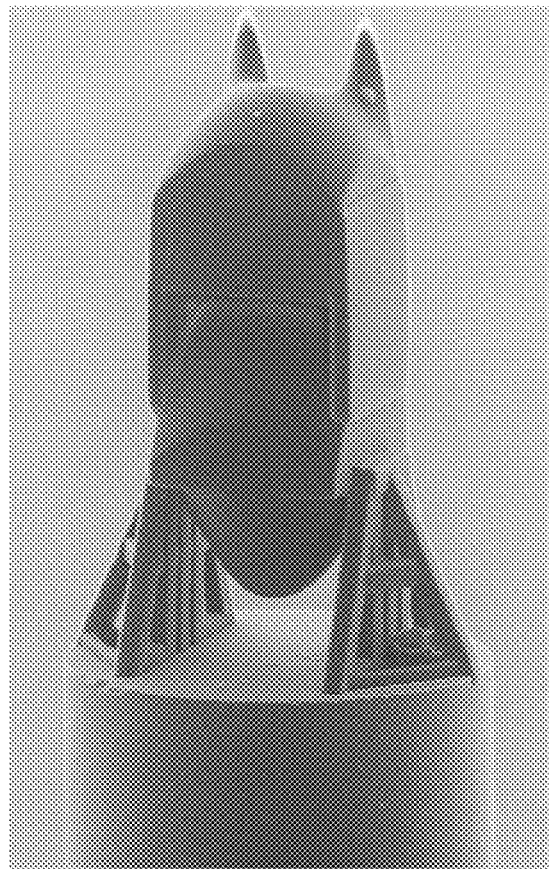

Reference is made to FIGS. 7A-7B, which illustrate a fiber mode sorter, in accordance with an embodiment of the present invention, including a vortex fiber facet and a three-element miniature mode sorter placed on the core of an optical fiber.

The fiber mode sorter uses a vortex optical fiber as a waveguide structure to maintain the OAM of a propagating beam. The vortex fiber may have a high-index ring profile, for example. A three-element miniature mode sorter is placed on the core of the optical fiber on a facet of the vortex fiber. The mode sorter is placed on the vortex fiber facet by using direct laser writing (DLW) to laser print the mode sorter on the vortex fiber facet.

The new device may be used for mode sorting of light beams with orbital angular momentum (OAM) travelling in an optical fiber, such as for communication applications.

The new device is a combination of a three-element miniature mode sorter placed on a core of a vortex fiber. The innovation of this invitation is based on the integration of 3 disciplines: direct laser writing (DLW), optical fibers and orbital angular momentum (OAM). This integration allows bringing the mode sorting concept for communication to an applicable stage. The DLW allows a mass production route for miniature devices, miniature devices can be located on fibers core, vortex fibers allow to progress vortex beams, and mode sorting of OAM beam can be done. Implanting new methods for the use of ceramics materials will extended the optical use of such devices in terms of optical loss and suitability to high energy laser beams. Applications of the invention include increasing capacity of optical communications and safe quantum communication.

The embodiment of the invention shown in FIGS. 7A-7B was made with commercial organic polymer photoresist which is limited with its optical and environment stability. However, the same concept can be done with improved ceramic/glassy materials such as sol-gel based UV-cured materials which were recently used in nano-imprint lithography (NIL) [30-32] or ceramics used by Greer at all (25,26). Ceramic/glassy materials possess optical, mechanical, and chemical properties which are appropriate to use in optical systems.

REFERENCES

1. M. J. Padgett, "Orbital angular momentum 25 years on", Invited review *Optics Express*, 25 (10) 11265-11274 (2017).
2. L. Allen, M. W. Beijersbergen, R. J. C. Spreeuw, and J. P. Woerdman, "Orbital angular momentum of light and the transformation of Laguerre-Gaussian laser modes", *Phys. Rev. A* 45 (11), 8185-8189 (1992).
3. J. Wang, J.-Y. Yang, I. M. Fazal, N. Ahmed, Y. Yan, H. Huang, Y. Ren, Y. Yue, S. Dolinar, M. Tur, and A. E. Willner, "Terabit free-space data transmission employing orbital angular momentum multiplexing," *Nat. Photonics* 6(7), 488-496 (2012).
4. Y. Yan., G. Xie, M. P. J. Lavery, H. Huang, N. Ahmed, C. Bao, Y. Ren, Y. Cao, L. Li, Z. Zhao, A. F. Molisch, M. Tur, M. J. Padgett and A. E. Willner, "High-capacity millimeter-wave communications with orbital angular momentum multiplexing", *Nature communications*, 5, 4876 (2014).
5. A. E. Willner, H. Huang, Y. Yan, Y. Ren, N. Ahmed, G. Xie, C. Bao, L. Li, Y. Cao, Z. Zhao, J. Wang, M. P. J. Lavery, M. Tur, S. Ramachandran, A. F. Molisch, N. Ashrafi, and S. Ashrafi, "Optical communications using orbital angular momentum beams," *Adv. Opt. Photonics* 7(1), 66 (2015).
6. Nenad Bozinovic, Yang Yue, Yongxiong Ren, Moshe Tur, Poul Kristensen, Hao Huang, Alan E. Willner, Siddharth Ramachandran, "Terabit-Scale Orbital Angular Momentum Mode Division Multiplexing in Fibers", *Science*, 340, 6140, pp. 1545-1548 (2013).
7. G. Gibson, J. Courtial, M. Padgett, M. Vasnetsov, V. Pas'ko, S. Barnett, and S. Franke-Arnold, "Free-space information transfer using light beams carrying orbital angular momentum," *Opt. Express* 12(22), 5448-5456 (2004).
8. G. Berkhout, M. Lavery, J. Courtial, M. Beijersbergen, and M. J. Padgett, "Efficient sorting of orbital angular momentum states of light," *Phys. Rev. Lett.* 105, 153601 (2010).
9. Martin P. J. Lavery, David J. Robertson, Gregorius C. G. Berkhout, Gordon D. Love, Miles J. Padgett, and Johannes Courtia, "Refractive elements for the measurement of the orbital angular momentum of a single photon", *Optics Express*, 20, 2111 (2012).
10. Hao Huang, Yongxiong Ren, Guodong Xie, Yan Yan, Yang Yue, Nisar Ahmed, Martin P. J. Lavery, Miles J. Padgett, Sam Dolinar, Moshe Tur, and Alan E. Willner, "Tunable orbital angular momentum mode filter based on optical geometric transformation", *Optics Letters*, 39 (6) 1689, (2014).
11. Alexandros Selimis. Vladimir Mironov. Maria Farsari, "Direct laser writing: Principles and materials for scaffold 3D printing", *Microelectronic Engineering*, 132, 25, 83-89 (2015).
12. M. T. Gale, M. Rossi, J. Pedersen, H. Schutz, "Fabrication of continuous-relief micro-optical elements by direct laser writing in photoresists", *Opt. Eng.*, 33 (1994), pp. 3556-3566.
13. S. Pelli, G. C. Righini, A. Scaglione, M. Guglielmi, A. Martucci, "Direct laser writing of ridge optical waveguides in silica-titania glass sol-gel films", *Opt. Mater.*, 5 (1996), pp. 119-126.
14. Maruo, Shoji; Nakamura, Osamu; Kawata, Satoshi, "Three-dimensional microfabrication with two-photon-absorbed photopolymerization", *Optics Letters* 22(2) 132-134, (1997).
15. Satoshi Kawata, Hong-Bo Sun, Tomokazu Tanaka, Kenji Takada, "Finer features for functional microdevices", *Nature*, 412, 6848, 697-698 (2001).
16. Markus Deubel, Martin Wegener, Artan Kaso and Sajeev John, "Direct laser writing and characterization of "Slanted Pore" Photonic Crystals", *APL*, 85, 1985, (2004).
17. Markus Deubel, Georg von Freymann1, Martin Wegener, Suresh Pereira, Kurt Busch & Costas M. Soukoulis, "Direct laser writing of three-dimensional photonic-crystal templates for telecommunications", *Nature Materials* 3, 444-447 (2004)
18. Ostendorf, A., Chichkov, B. N., "Two-photon polymerization: A new approach to micromachining", *Photonics Spectra*, 40, 10, 72-80 (2006).
19. http://www.nanoscribe.de/en/
20. M. Thiel, H. Fischer, G. von Freymann, and M. Wegener, "Three-dimensional chiral photonic superlattices", Optics Letters, 35, 166 (2010).
21. Fischer, J., Von Freymann, G., Wegener, M., "The materials challenge in diffraction unlimited direct-laser-writing optical lithography", *Advanced Materials*, 22, 32, 3578-3582 (2010).
22. S. W. Hell, J. Wichmann, "Breaking the diffraction resolution limit by stimulated emission: stimulated-emission-depletion fluorescence microscopy", Optics Letters, 19, 1994.
23. Carlo Liberale, Gheorghe Cojoc, Patrizio Candeloro, Gobind Das, Francesco Gentile, Francesco De Angelis, and Enzo Di Fabrizio, "Micro-Optics Fabrication on Top of Optical Fibers Using Two-Photon Lithography", *IEEE Photonics Technology letters*, 22, 474 (2010)
24. Weiss, I., Marom, D. M., "Direct 3D nanoprinting on fiber tip of collimating lens and OAM mode converter in one compound element", *Optical Fiber Communications* (Conference paper), OFC 75374242016 (2016).
25. Lucas R. Meza, Satyajit Das, Julia R. Greer, "Strong, lightweight, and recoverable three-dimensional ceramic nanolattices", *Science*, 345, 6202, pp. 1322-1326 (2014).
26. L. C. Montemayor, J. R. Greer, "Mechanical Response of Hollow Metallic Nanolattices: Combining Structural and Material Size Effects", *Journal of Applied Mechanics*, 82, 071012-1, (2015).

27. Shlomi Lightman, Raz Gvishi, Gilad Hurvitz, and Ady Arie, "Shaping of light beams by 3D direct laser writing on facets of nonlinear crystals", *Optics Letters*, 40, 19, 4460-4463 (2015).
28. Shlomi Lightman, Raz Gvishi, Gilad Hurvitz, and Ady Arie, "Miniature wide-spectrum multiplexer for vortex beams produced by 3D laser printing", *Optica*, 4, 605 (2017).
29. C. Brunet, B. Ung, L. Wang, Y. Messaddeq, S. LaRochelle, and L. A. Rusch, "Design of a family of ring-core fibers for OAM transmission studies," Opt. Express 23, 10553 (2015).
30. Shlomi Lightman, Raz Gvishi, Gilad Hurvitz, and Ady Arie, "Comparative Analysis of Direct Laser Writing and Nano-Imprint Lithography for Fabrication of Optical Phase Elements", *Applied Optics*, 55, 9724 (2016).
31. Philipp Brenner, Ofer Bar-On, Tobias Siegle, Raz Gvishi, Carsten Eschenbaum, Heinz Kalt, Jacob Scheuer, and Uli Lemmer, "3-D Whispering Gallery Mode Microlasers by Direct Laser Writing and Soft Nanoimprint Lithography", *Applied Optics*, 56, 3703 (2017).
32. Ofer Bar-On, Philipp Brenner, Tobias Siegle, Raz Gvishi, Heinz Kalt, Uli Lemmer & Jacob Scheuer, "High Quality 3D Photonics using Nano Imprint Lithography of Fast Sol-gel Materials", *Scientific Research*, published on line: 18 May 2018.

The invention claimed is:

1. A fiber mode sorter comprising:
    an optical fiber comprising a waveguide structure configured to maintain an orbital angular momentum (OAM) of a beam propagating through said optical fiber; and
    an OAM mode sorter placed on a core of said optical fiber.

2. The fiber mode sorter according to claim 1, wherein said fiber comprises a vortex fiber.

3. The fiber mode sorter according to claim 2, wherein said OAM mode sorter is placed on a facet of said vortex fiber.

4. A method of forming a fiber mode sorter comprising:
    placing an orbital angular momentum (OAM) mode sorter on a core of an optical fiber, said optical fiber comprising a waveguide structure configured to maintain an OAM of a beam propagating through said optical fiber.

5. The method according to claim 4, wherein said fiber comprises a vortex fiber.

6. The method according to claim 5, comprising placing said OAM mode sorter on a facet of said vortex fiber.

7. The method according to claim 4, wherein the step of placing comprises printing said OAM mode sorter on said core by using direct laser writing.

* * * * *